(12) United States Patent
Bastani et al.

(10) Patent No.: US 8,826,394 B1
(45) Date of Patent: Sep. 2, 2014

(54) METHODS, DEVICES, AND MEDIUMS ASSOCIATED WITH SECURITY ACCESS REQUESTED ON AN AS-NEEDED BASIS

(75) Inventors: Behfar Bastani, Mountain View, CA (US); Sagan Sidhu, Mountain View, CA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 0 days.

(21) Appl. No.: 13/425,223

(22) Filed: Mar. 20, 2012

(51) Int. Cl.
*G06F 21/00* (2013.01)
*G06F 21/31* (2013.01)

(52) U.S. Cl.
CPC ........ *G06F 21/31* (2013.01); *G06F 2221/2113* (2013.01)
USPC ................................ 726/5; 709/206; 713/166

(58) Field of Classification Search
CPC ................. H04L 63/105; G06F 21/31; G06F 2221/2113
USPC ............................................................. 726/5
See application file for complete search history.

(56) References Cited

U.S. PATENT DOCUMENTS 7,454,622 B2 * 11/2008 Laidlaw et al. ............... 713/182
8,549,591 B2 * 10/2013 Vidal ................................. 726/5
2004/0093334 A1 * 5/2004 Scherer ............................. 707/8
2005/0198247 A1 * 9/2005 Perry et al. ..................... 709/223
2007/0006285 A1 * 1/2007 Stafie et al. ....................... 726/4
2007/0250920 A1 * 10/2007 Lindsay ............................ 726/7
2008/0022363 A1 * 1/2008 Le et al. ............................ 726/2
2008/0320588 A1 * 12/2008 Lipetz ............................. 726/19
2012/0011577 A1 * 1/2012 Mashimo ........................... 726/7

OTHER PUBLICATIONS

Stolowitz Ford Cowger LLP, "Listing of Related Cases", Apr. 25, 2012, 1 page.

* cited by examiner

*Primary Examiner* — Hadi Armouche
*Assistant Examiner* — Bryan Wright
(74) *Attorney, Agent, or Firm* — Stolowitz Ford Cowger LLP

(57) ABSTRACT

In one example, a network device may be configured to authenticate a user based on a first pre-shared secret associated with a first login request as a condition to granting the user limited access. The network device may be configured to determine whether a received second request for the user is associated with an additional level of access. The network device may be configured to, in response to determining that the second request is associated with the additional level of access, authenticate the user based on a second pre-shared secret as a condition to granting the user the additional level of access.

38 Claims, 4 Drawing Sheets

METHODS, DEVICES, AND MEDIUMS ASSOCIATED WITH SECURITY ACCESS REQUESTED ON AN AS-NEEDED BASIS

TECHNICAL FIELD

The present disclosure is related generally to security.

BACKGROUND

Known security schemes require login information, e.g., a username and a password, as a condition to granting access to a domain, e.g., a web site. The known security schemes may permit access to the domain from a terminal irrespective of whether or not such a terminal is publicly accessible. Permitting access from a publically accessible terminal, in particular, may impose a risk that an unauthorized person may obtain the login information and fraudulently access the domain.

DETAILED DESCRIPTION

Figure 1:
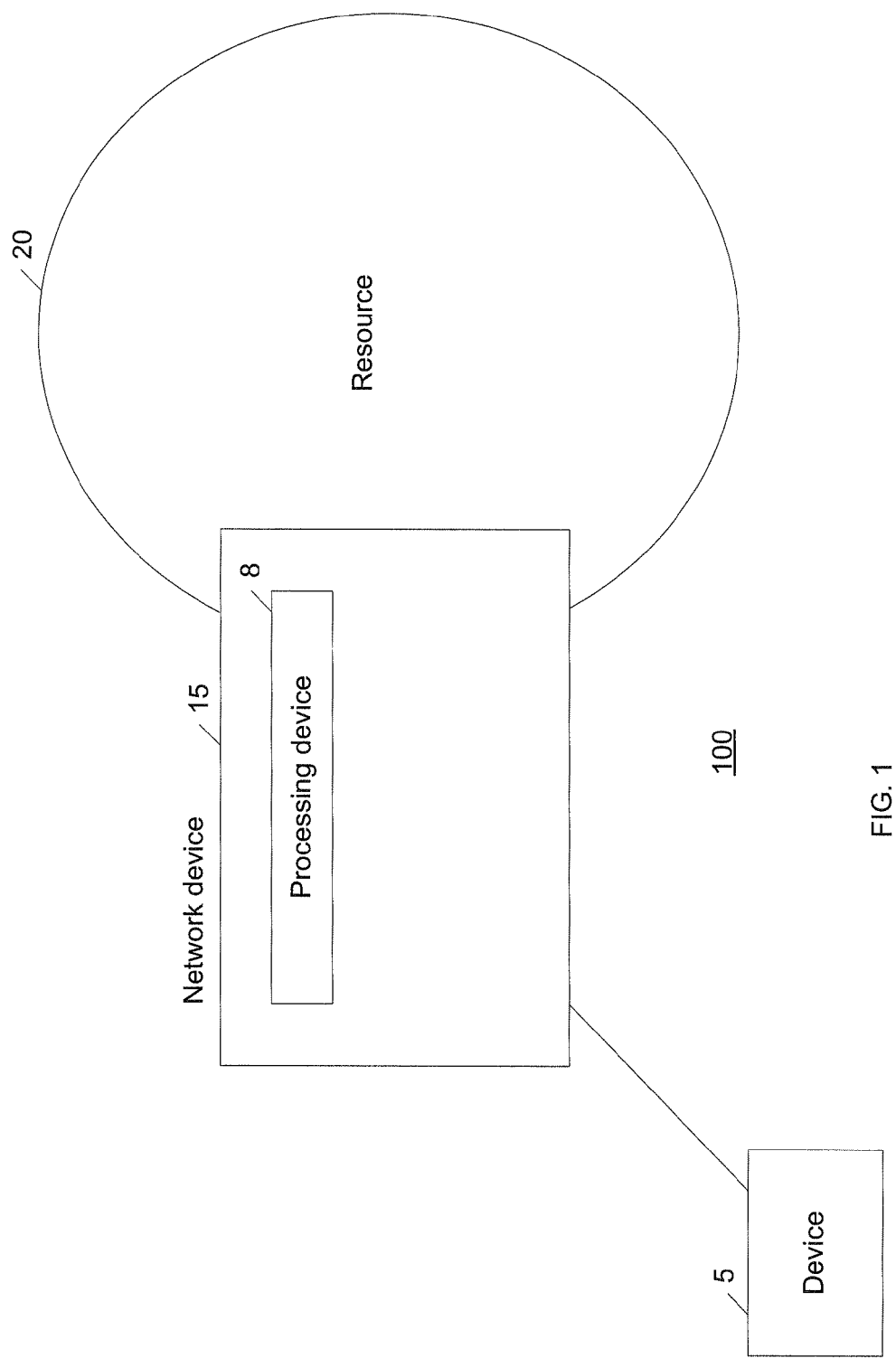
FIG. 1 depicts a block diagram of an example system associated with security access requested on an as-needed basis.

FIG. 1 depicts a block diagram of an example system 100 associated with security access requested on an as-needed basis. System 100 may include a network device 15 having a processing device 8. In an example, processing device 8 may receive a request originating from a device 5 to log into a resource 20, e.g., a domain, an application, a system, or the like. Processing device 8 may be configured to grant limited access to resource 20 in response to receiving the request.

Processing device 8 also may be configured to enable device 5 to submit a request to unlock additional access to resource 20. In response to receiving a request to unlock the additional access to resource 20, processing device 8 may unlock additional access to resource 20.

Figure 2:
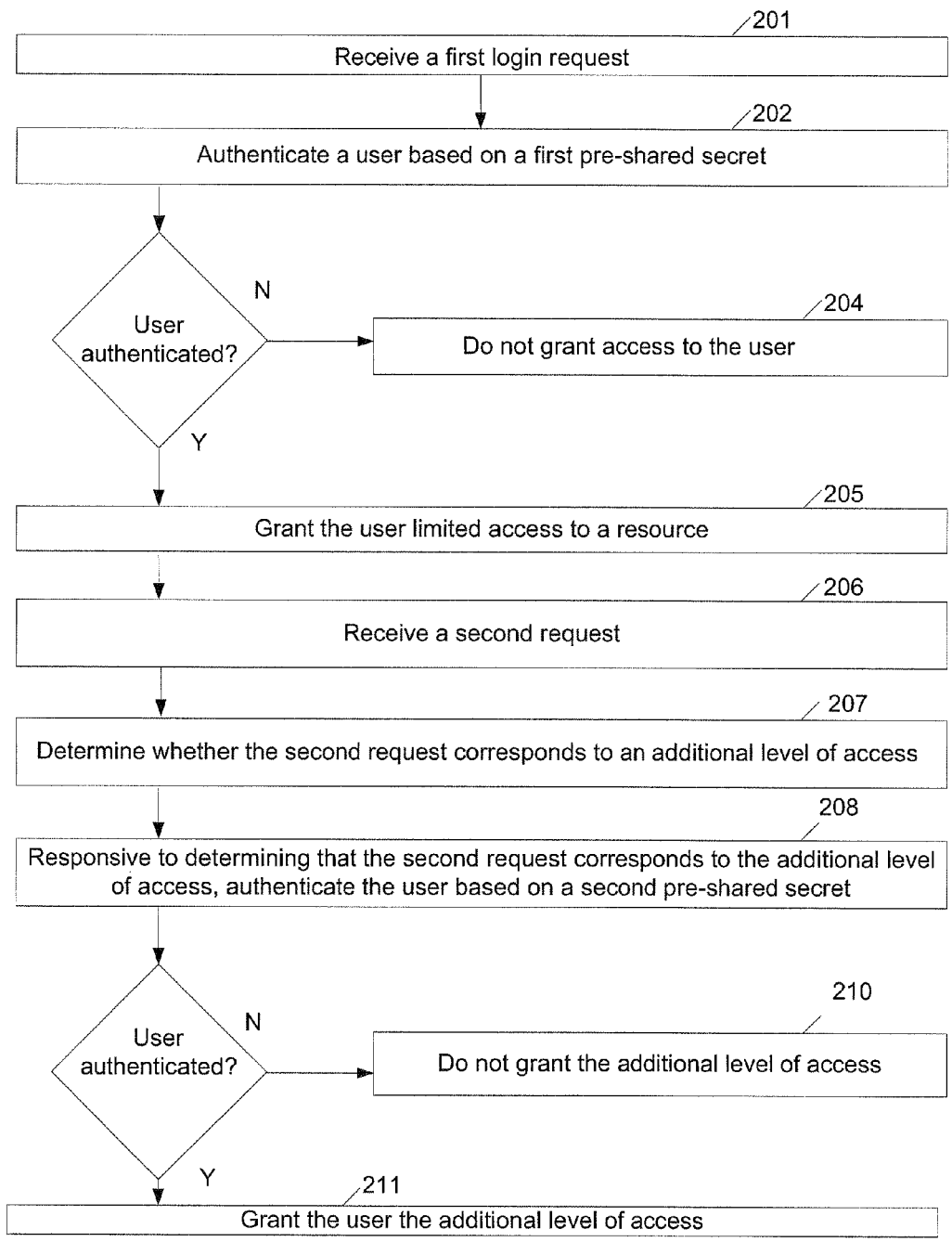
FIG. 2 depicts a flow chart of an example process for providing security access on an as-needed basis.

FIG. 2 depicts a flow chart of an example process for providing security access on an as-needed basis. In block 201, processing device 8 (FIG. 1) may receive a first login request, e.g., a request to log into a resource. Processing device 8 may authenticate a user, e.g., a user-defined username, a system-defined username, or the like, based on a first pre-shared secret, e.g., a preconfigured question and answer, a password, or the like, in block 202. If the user is not authenticated, processing device 8 may not grant access to the user block 204. If, however, the user is authenticated, processing device 8 may grant the user limited access, e.g., limited access to the resource, in block 205.

Processing device 8 may receive a second request in block 206. In block 207, processing device 8 may determine whether the second request corresponds to an additional level of access. In block 208, responsive to determining that the second request corresponds to the additional level of access, processing device 8 may authenticate the user based on a second pre-shared secret that may be different than the first pre-shared secret. In an example, the authentication responsive to the first login request may be based on a first password, whereas the authentication responsive to the second request may be based on a second password that may be different than the first password. In an example, the second request may comprise a message transmitted over a network, and the second pre-shared secret may be contained in the same message.

If the user is not authenticated, processing device 8 may not grant the additional level of access in block 210. If, however, the user is authenticated, processing device 8 may grant the user the additional level of access in block 211.

In an example, processing device 8 may assign a first lifetime to the first pre-shared secret. Processing device 8 may assign a second lifetime to the second pre-shared secret. The second lifetime may be different than the first lifetime.

In an example, the first pre-shared secret may be associated with a first confidence level. The second pre-shared secret may be associated with a second confidence level that may be different, e.g., higher, than the first confidence level.

Figure 3:
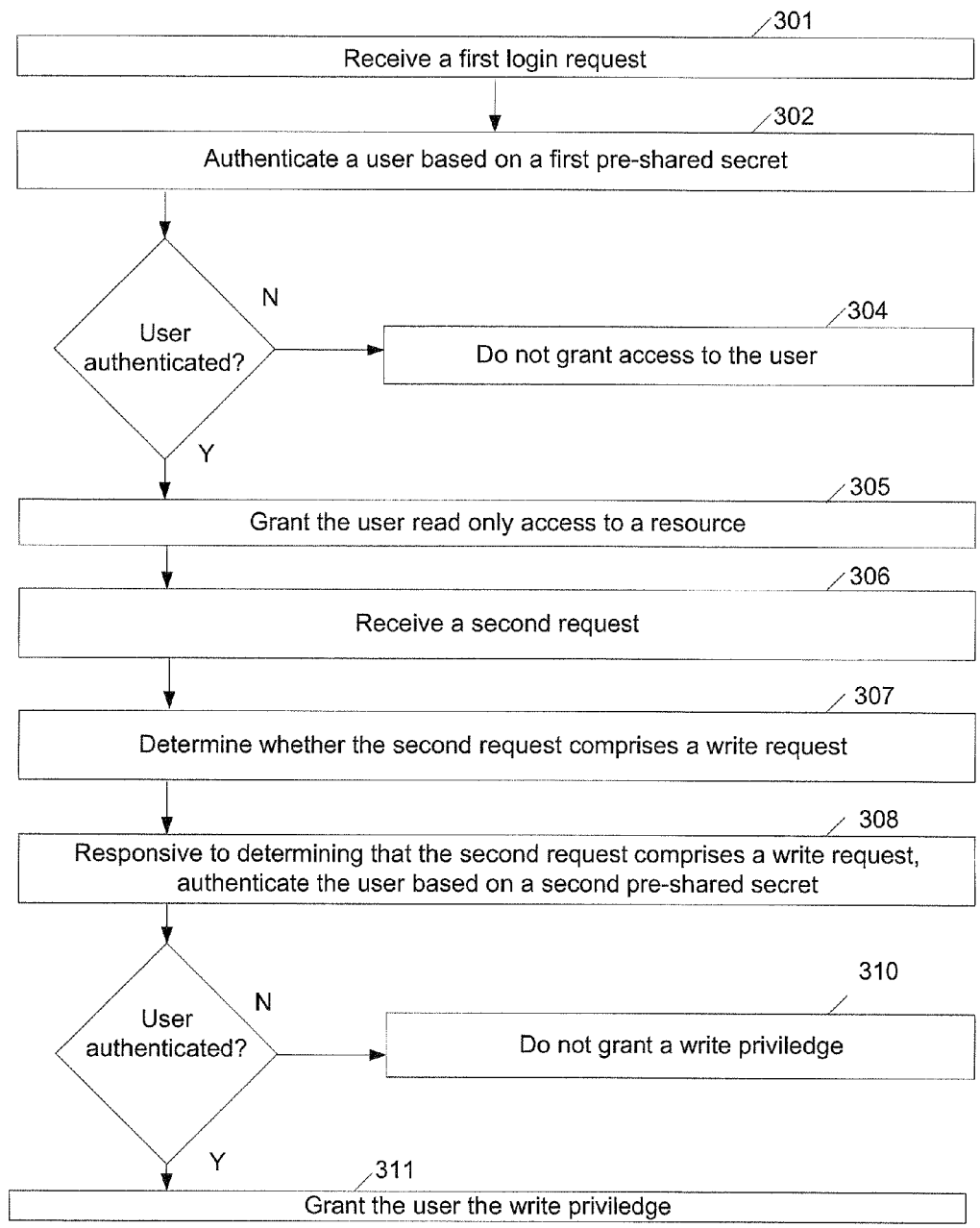
FIG. 3 depicts a flow chart of an example process for unlocking a write privilege on an as-needed basis.

FIG. 3 depicts a flow chart of an example process for unlocking a write privilege on an as-needed basis. In blocks 301-304, similar processes may be performed as those processes performed in blocks 201-204 of FIG. 2.

If the user is authenticated, processing device 8 may grant the user read only access to a resource in block 305. For example, processing device 8 may permit a user to check an online account, but processing device 8 may not permit the user to make any changes to the on-line account, e.g., no transactions, during read only access.

Processing device 8 may receive a second request in block 306. In block 307, processing device 8 may determine whether the second request comprises a write request. In block 308, responsive to determining that the second request comprises a write request, processing device 8 may authenticate the user based on a second pre-shared secret.

If the user is not authenticated, processing device 8 may not grant a write privilege in block 310. If, however, the user is authenticated, processing device 8 may grant the user the write privilege in block 311.

In an example, the write request may identify a particular transaction to be performed. Processing device 8 may unlock the additional level of access by transmitting information, e.g., a token, a passphrase, or the like, to an email address, to a mobile device, or the like. Transmission may be by text message (including but not limited to Short Message Service (SMS)), email message, telephone call, video call, or the like.

A transmitted token may be configured to enable the particular transaction. Processing device 8 may assign a lifetime to the token. The lifetime may cause the token to expire after a designated time, after a certain number of attempts, after a certain amount of inactivity, after receiving a different token, or the like, or combinations thereof. The token may comprise a use-once token, or a use-N-times token.

Figure 4:
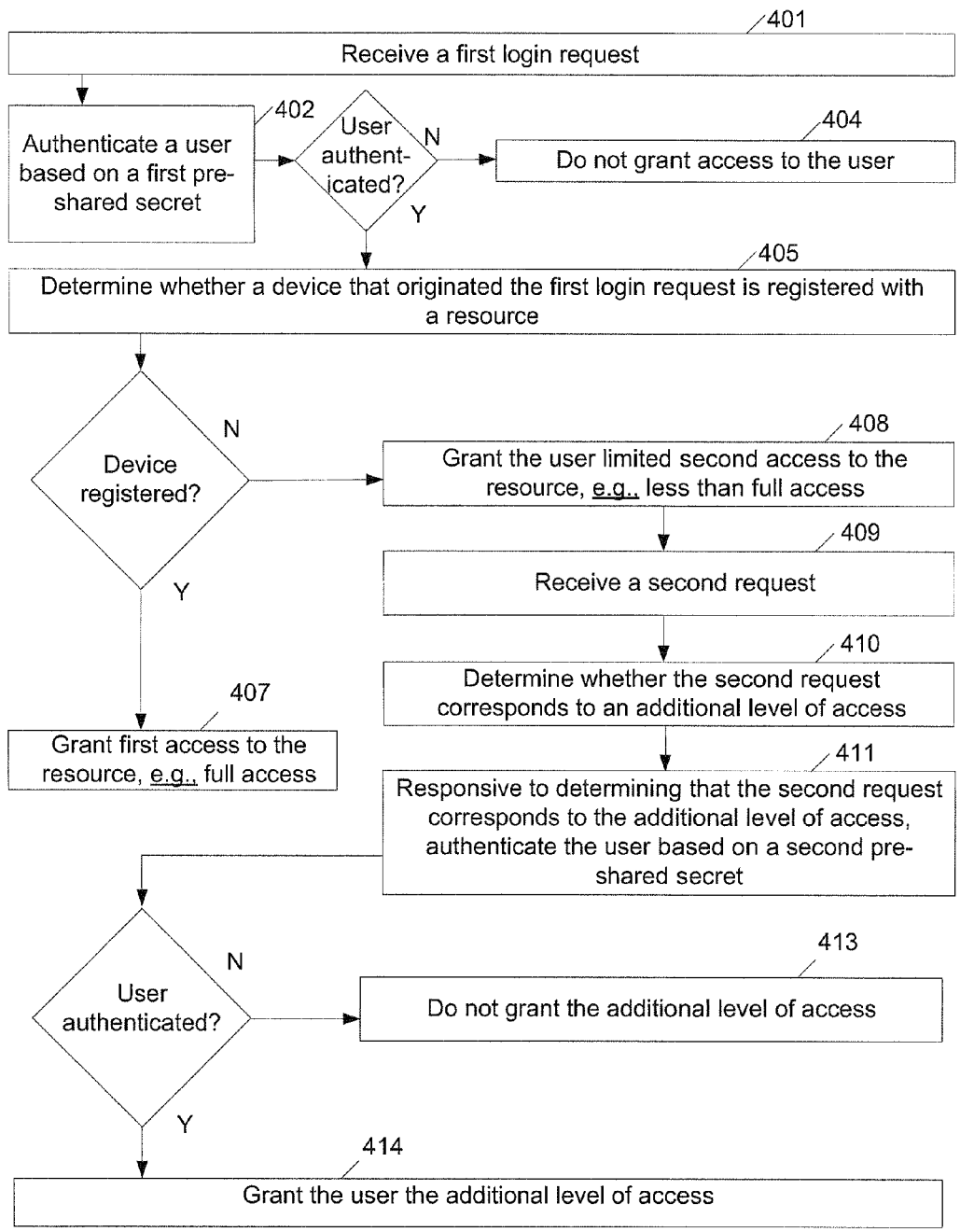
FIG. 4 depicts a flow chart of an example process for providing different access to an unregistered device than a registered device.

FIG. 4 depicts a flow chart of an example process for providing different access to an unregistered device than a registered device. In blocks 401-404, similar processes may be performed as those processes performed in blocks 201-204 of FIG. 2.

If the user is authenticated, processing device 8 may determine whether a device that originated the first login request is registered with a resource in block 405. If processing device 8 determines that the device that originated the first login request is registered with the resource, processing device 8 may grant first access to the resource, e.g., full access, in block 407. If, however, processing device 8 determines that the device that originated the first login request is not registered with the resource, processing device 8 may grant the user limited second access to the resource, e.g., less than full access, in block 408.

Processing device 8 may receive a second request in block 409. In block 410, processing device 8 may determine whether the second request corresponds to an additional level of access. In block 411, responsive to determining that the second request corresponds to the additional level of access, processing device 8 may authenticate the user based on a second pre-shared secret.

If the user is not authenticated, processing device 8 may not grant the user the additional level of access in block 413. If, however, the user is authenticated, processing device 8 may grant the user the additional level of access in block 414.

In an example, the first access may include write access to the resource. The second access may include read only access to the resource.

Processing device 8 may grant the first access for a first predetermined length of time. Processing device 8 may grant the second access for a second predetermined length of time that may be different than the first predetermined length of time. Processing device 8 may grant the additional level of access for a third predetermined length of time that may be different than the first predetermined length of time and/or the second predetermined length of time. In an example, processing device 8 may grant the additional level of access by enabling a predetermined number of transactions, e.g., read transactions, write transactions, or combinations thereof.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

One non-limiting example of an application of at least some of the principles described above with respect to FIGS. 1-4 is with respect to on-line banking. With respect to on-line banking, a network device may control access to an on-line bank. The on-line bank may provide an account preference setting that may allow customers to enable/allow a limited access mode, e.g., read only access, for their account with the on-line bank, if the customer desires such access. In an example, if the customer sets the account preference setting to enable the limited access mode, the network device may obtain from the customer at least one additional password, e.g., a limited use password and a password to unlock additional access. The network device may associate the additional password or passwords with a login username for the customer.

Thereafter, the network device may enable limited access to a bank account of the customer in response to receiving login information including the login username and the limited access password. In an example, during the limited access mode, the network device may enable the customer to check account balances, but may not permit transactions.

The customer may desire to make a transaction during a session initiated using the limited access password. In an example, the network device may prompt the customer for secret information, e.g., the password to unlock the additional access, during the session. In another example, the network device may verify that the user has access to a third party account, e.g., an email account, a social networking account, or the like, by transmitting over the network to the third party account information needed to enable the transaction during the session. In another example, the network device may verify that the user has physical access to a personal portable device, e.g., a mobile telephone associated with the customer, by transmitting over the network to the personal portable device information to enable the transaction during the session. If the secret information is provided, the third party account access verified, or the physical access to the personal portable device verified, or any combination thereof, the network device may enable the customer to complete the transaction during the session.

The term "session" used throughout refers to any number of associated transactions. A session may be associated with one or more applications, one or more domains, or one or more systems. In the context of browsers, it is known that a session may or may not end when a browser is closed. For example, a user may close a browser, but then later may re-open the browser without starting a new session.

The invention claimed is:

1. An apparatus comprising memory having instructions stored thereon that, in response to execution by a processing device, cause the processing device to perform operations comprising,
   authenticating a user based on a first pre-shared secret associated with a first login request as a condition to granting the user limited access to a resource, wherein the first pre-shared secret is associated with the user;
   after granting the user the limited access to the resource, receiving a second request for the user, wherein the second request is received over a first communication path;
   determining whether the second request corresponds to an additional level of access to the resource;
   and in response to determining that the second request corresponds to the additional level of access to the resource, authenticating the user based on a second pre-shared secret as a condition to granting the user the additional level of access to the resource, wherein the additional level of access includes an access privilege that is not included in the grant of the limited access, wherein the second pre-shared secret is associated with the user, and wherein the second pre-shared secret is different than the first pre-shared secret;
   wherein granting the additional level of access to the resource further comprises transmitting control access information over a second communication path that is different than the first communication path.

2. The apparatus of claim 1, wherein the operations further comprise assigning a lifetime to a grant of the additional level of access to the resource.

3. The apparatus of claim 1, wherein the first pre-shared secret comprises a first password, and wherein the second pre-shared secret comprises a second password that is different than the first password.

4. The apparatus of claim 1, where the operations further comprise:
   determining whether a device that originated the first login request is registered with the resource;
   granting the limited access only in response to determining that the device is not registered with the resource; and
   granting a different access in response to determining that the device is registered with the resource.

5. The apparatus of claim 1, wherein the limited access comprises read only access, and wherein the additional level of access to the resource comprises write access.

6. The apparatus of claim 5, wherein the additional level of access to the resource is for a predetermined number of transactions.

7. The apparatus of claim 1, wherein granting the additional level of access to the resource further comprises transmitting information to an email address.

8. The apparatus of claim 1, wherein granting the additional level of access to the resource further comprises transmitting information to a mobile device.

9. The apparatus of claim 1, wherein granting the additional level of access to the resource further comprises transmitting a token.

10. The apparatus of claim 9, wherein the second request identifies a particular transaction to be performed.

11. The apparatus of claim 10, wherein the token comprises a verification code to be sent back by the user in order to enable the particular transaction.

12. A method comprising:
    receiving a first login request for a user;
    in response to receiving the first login request, authenticating the user based on a first pre-shared secret as a condition to storing data in a memory device to grant the user limited access to a resource, wherein the first pre-shared secret is associated with the user;
    after granting the user the limited access to the resource, receiving a second request for the user, wherein the second request is received over a first communication path;
    determining whether the second request corresponds to an additional level of access to the resource; and
    in response to determining that the second request corresponds to the additional level of access to the resource, wherein the additional level of access includes an access privilege that is not included in the grant of the limited access, authenticating the user based on a second pre-shared secret as a condition to changing the data stored in the memory device to grant the user the additional level of access to the resource, wherein the second pre-shared secret is associated with the user, and wherein the second pre-shared secret is different than the first pre-shared secret;
    wherein granting the additional level of access to the resource further comprises transmitting control access information over a second communication path that is different than the first communication path.

13. The method of claim 12, further comprising assigning a lifetime to a grant of the additional level of access to the resource.

14. The method of claim 12, wherein the first pre-shared secret comprises a first password, and wherein the second pre-shared secret comprises a second password that is different than the first password.

15. The method of claim 12, further comprising:
    determining whether a device that originated the first login request is registered with the resource;
    granting the limited access only in response to determining that the device is not registered with the resource; and
    granting a different access in response to determining that the device is registered with the resource.

16. The method of claim 12, wherein the limited access comprises read only access, and wherein the additional level of access to the resource comprises write access.

17. The method of claim 16, wherein the additional level of access to the resource is for a predetermined number of transactions.

18. The method of claim 12, wherein changing the data stored in the memory device to grant the additional level of access to the resource further comprises transmitting information to an email address.

19. The method of claim 12, wherein changing the data stored in the memory device to grant the additional level of access to the resource further comprises transmitting information to a mobile device.

20. The method of claim 12, wherein changing the data stored in the memory device to grant the additional level of access to the resource further comprises transmitting a token.

21. The method of claim 20, wherein the second request identifies a particular transaction to be performed.

22. The method of claim 21, wherein the token comprises a verification code to be sent back by the user in order to enable the particular transaction.

23. The method of claim 22, further comprising assigning a lifetime to the token.

24. An apparatus, comprising:
   means for authenticating the user based on a first pre-shared secret associated with a first login request as a condition to granting the user limited access to a resource, wherein the first pre-shared secret is associated with the user;
   means for determining whether a second request for the user corresponds to an additional level of access to the resource after granting the user the limited access to the resource and in response to receiving the second request; and
   means for authenticating the user based on a second pre-shared secret as a condition to granting the user the additional level of access to the resource in response to determining that the second request corresponds to the additional level of access to the resource, wherein the additional level of access includes an access privilege that is not included in the grant of the limited access, wherein the second pre-shared secret is associated with the user, and wherein the second pre-shared secret is different than the first pre-shared secret; and
   means for granting the additional level of access to the resource transmitting control access information over a second communication path that is different than a first communication path corresponding to the second request.

25. The apparatus of claim 24, further comprising means for assigning a lifetime to a grant of the additional level of access to the resource.

26. The apparatus of claim 24, wherein the first pre-shared secret comprises a first password, and wherein the second pre-shared secret comprises a second password that is different than the first password.

27. The apparatus of claim 24, wherein the limited access comprises read only access, and wherein the additional level of access to the resource comprises write access.

28. The apparatus of claim 27, wherein the additional level of access to the resource is for a predetermined number of transactions.

29. The apparatus of claim 24, further comprising means for transmitting a token in response to authenticating the user based on the second pre-shared secret.

30. The apparatus of claim 29, wherein the second request identifies a particular transaction to be performed.

31. The apparatus of claim 30, wherein the token comprises a verification code to be sent back by the user in order to enable the particular transaction.

32. The apparatus of claim 24, further comprising means for transmitting information to an email address to grant the additional level of access to the resource.

33. The apparatus of claim 1, wherein the second request identifies a particular transaction to be performed.

34. The method of claim 12, wherein the second request identifies a particular transaction to be performed.

35. The apparatus of claim 24, wherein the second request identifies a particular transaction to be performed.

36. The apparatus of claim 1, wherein the resource comprises an account corresponding to the user, and wherein the second request identifies a requested change to the account.

37. The method of claim 12, wherein the resource comprises an account corresponding to the user, and wherein the second request identifies a requested change to the account.

38. The apparatus of claim 24, wherein the resource comprises an account corresponding to the user, and wherein the second request identifies a requested change to the account.

* * * * *